United States Patent [19]

Matsumoto et al.

[11] Patent Number: 4,867,220
[45] Date of Patent: Sep. 19, 1989

[54] SUNSHADE ASSEMBLY OF MOTOR VEHICLE

[75] Inventors: Masaharu Matsumoto; Hisato Tatsumi, both of Yokohama, Japan

[73] Assignee: Ohi Seisakusho Co., Ltd., Yokohama, Japan

[21] Appl. No.: 174,889

[22] Filed: Mar. 29, 1988

[30] Foreign Application Priority Data

| Mar. 30, 1987 | [JP] | Japan | 62-77058 |
| Mar. 30, 1987 | [JP] | Japan | 62-77059 |
| Mar. 30, 1987 | [JP] | Japan | 62-47163[U] |

[51] Int. Cl.$^4$ ............................................. E04F 10/10
[52] U.S. Cl. ........................................ 160/35; 160/36; 160/84.1; 296/219
[58] Field of Search .................... 160/32, 33, 35, 36, 160/84.1, 206, 370.1, DIG. 2, 79, 207; 296/97 R, 97 G, 141, 216, 105, 219

[56] References Cited

U.S. PATENT DOCUMENTS

| 1,860,463 | 5/1932 | Kaplan et al. | 296/219 |
| 3,201,171 | 8/1965 | Wickard | 296/105 X |
| 3,658,378 | 4/1972 | Sutren | 296/219 |
| 3,666,318 | 5/1972 | Butler | 296/219 |
| 3,695,329 | 10/1972 | Roller | 160/84.1 |
| 3,740,092 | 6/1973 | Page | 296/105 |
| 3,783,930 | 1/1974 | Williams | 160/206 X |
| 3,819,227 | 6/1974 | Carli | 296/219 |
| 3,820,840 | 6/1974 | Forsberg | 296/219 X |
| 3,924,671 | 12/1975 | Gates | 160/206 X |
| 4,067,603 | 1/1978 | Fenton | 296/219 X |
| 4,374,537 | 2/1983 | Lindbergh | 160/207 X |
| 4,603,723 | 8/1986 | Sugihara | 160/35 |
| 4,754,795 | 7/1988 | Garrod | 160/33 X |

FOREIGN PATENT DOCUMENTS

| 60-51121 | 4/1985 | Japan . |
| 294341 | 7/1928 | United Kingdom . |
| 312485 | 5/1929 | United Kingdom . |

Primary Examiner—Ramon S. Britts
Assistant Examiner—David G. Kolman
Attorney, Agent, or Firm—Foley & Lardner, Schwartz, Jeffery, Schwaab, Mack, Blumenthal & Evans

[57] ABSTRACT

A sunshade assembly for use with a sun roof construction of a motor vehicle is disclosed, which comprises two chain units each including first and second groups of guided pieces and a plurality of links pivotally connected to the first and second groups of guided pieces in a zig-zag manner, two guide rails each having at its inboard side upper and lower guide grooves for slidably receiving therein the first and second groups of guided pieces respectively, a plurality of supporting rods each extending between one guided piece of the first group associated with one guide rail and another guided piece of the first group associated with the other guide rail, and a shading cloth having thereon a plurality of supported portions which are supported by the supporting rods respectively.

21 Claims, 11 Drawing Sheets

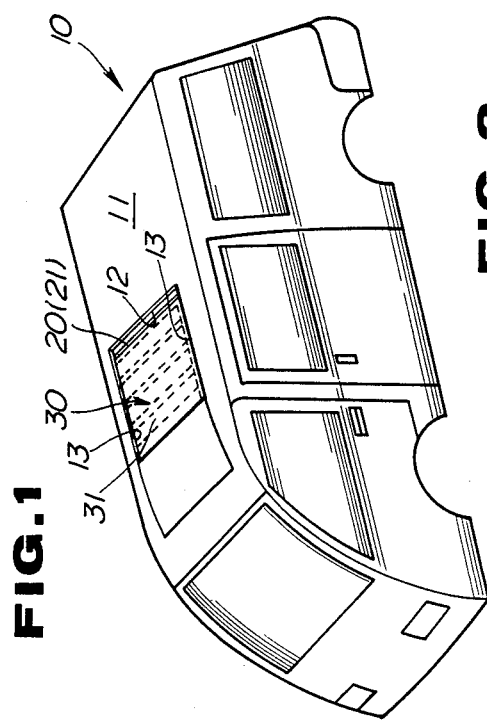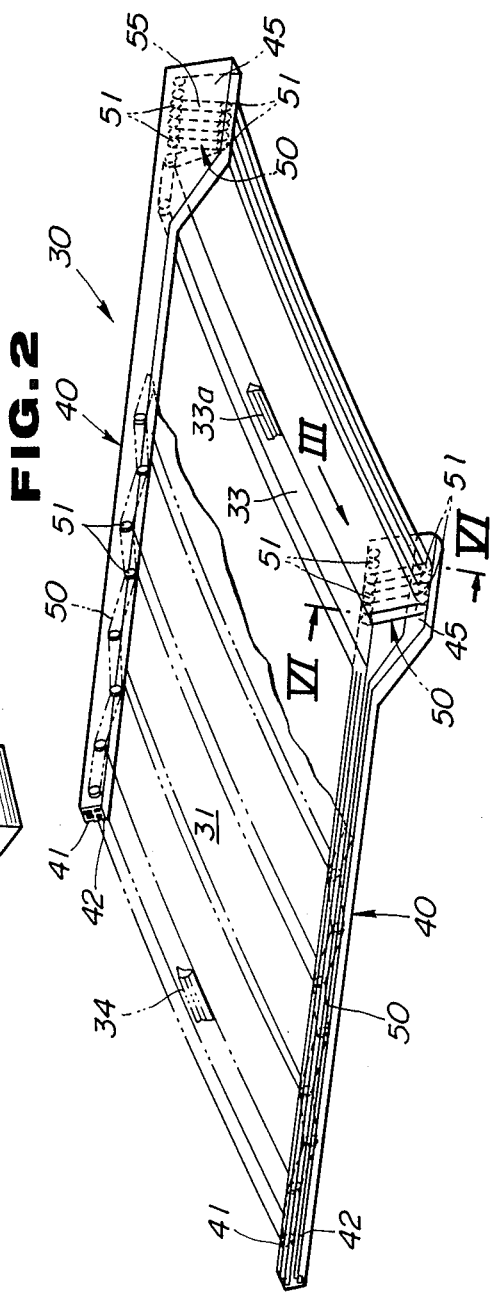

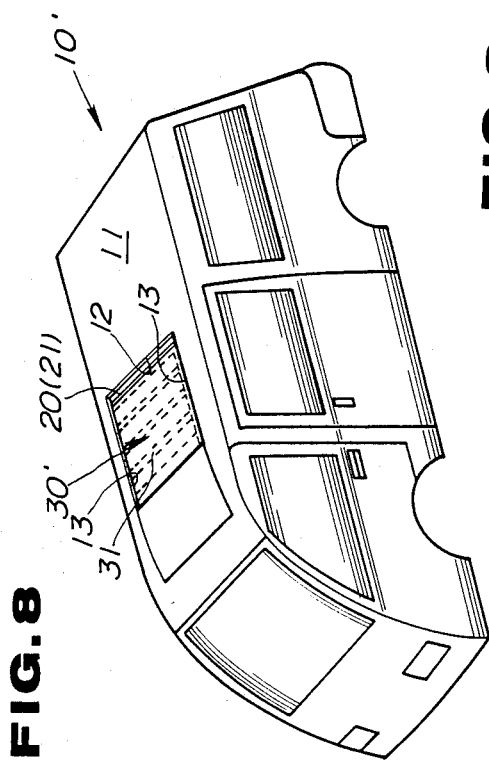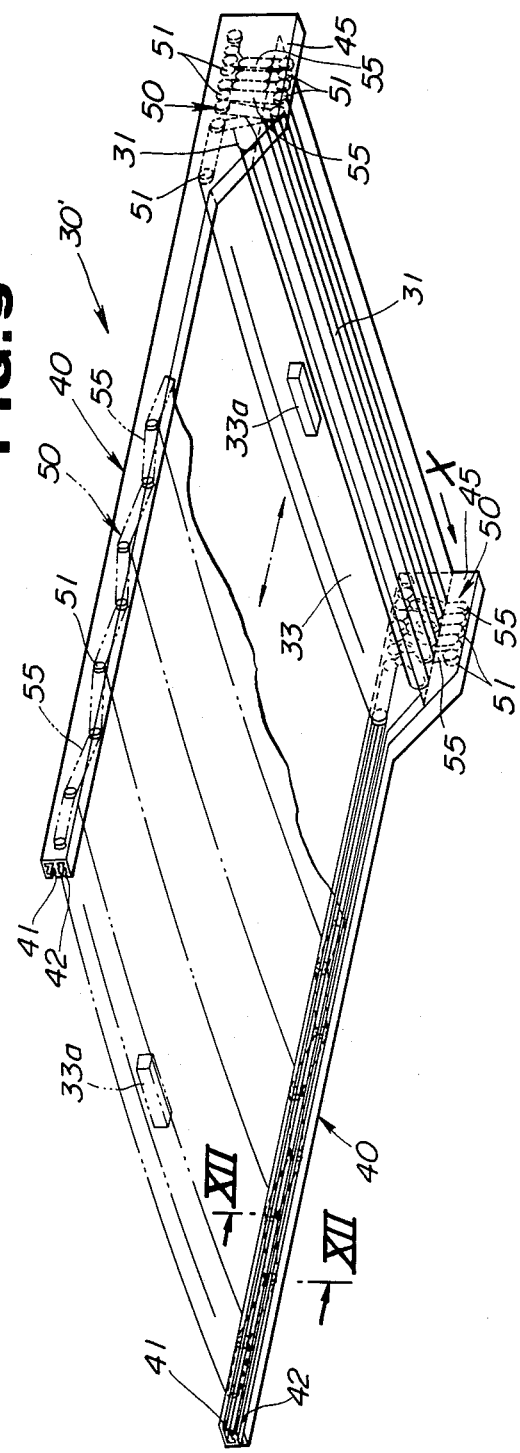

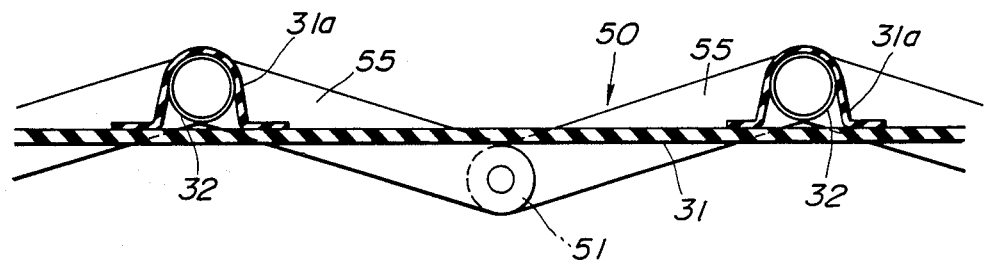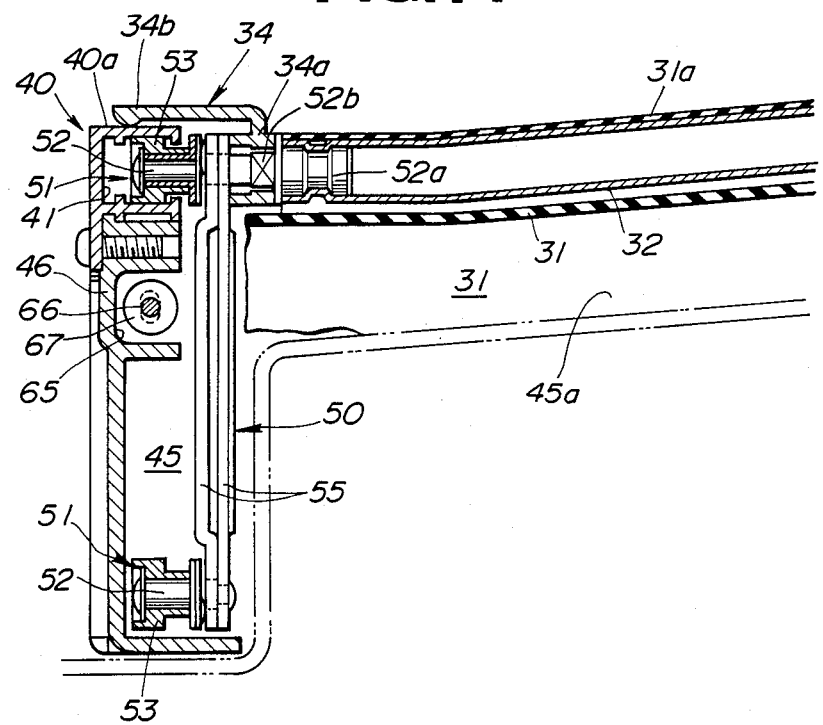

_4,867,220_

SUNSHADE ASSEMBLY OF MOTOR VEHICLE

BACKGROUND OF THE INVENTION

1. Field of the Invention

The present invention relates in general to a sunshade assembly which, as occasion demands, covers a sun roof opening formed in a roof of a motor vehicle, and more particularly, the present invention relates to a sunshade assembly which is associated with a sun roof construction of the type which uses a transparent panel, such as glass panel, plastic panel or the like, as a sun roof proper.

2. Description of the Prior Art

One conventional sunshade assembly is disclosed in Japanese Utility Model First Provisional Publication No. 60-51121. The sunshade assembly is associated with a sun roof construction of a motor vehicle. The sun roof construction uses a glass panel as the sun roof proper, which is detachably mounted on a roof of the vehicle to cover an opening formed in the roof. The sunshade assembly is installed below the opening of the roof and has a curtain of cloth which is movable foreward or backward to close or open the opening. That is, the curtain has lateral sides slidably supported, via shoes, by guide rails which are secured to the side edges of the opening to extend along the same.

However, due to its inherency in construction, the above-mentioned conventional sunshade assembly has the following drawbacks.

That is, when the curtain assumes a position other than its fully extended position, that is a half-closing (or half-opening) position relative to the sun roof opening, unsightly creases and wrinkles are forced to appear particularly at a middle portion of the curtain. This deteriorates not only the internal appearance of the vehicle but also the proper function of the sunshade assembly.

SUMMARY OF THE INVENTION

It is therefore an essential object of the present invention to provide a sunshade assembly which is free of the above-mentioned drawback.

According to the present invention, there is provided a sunshade assembly in which a shading cloth is prevented from producing unsightly creases and wrinkles even when the same assumes its half-opening position relative to a sun roof opening.

According to the present invention, there is provided a sunshade assembly which comprises a pair of guide rails, each having longitudinally extending upper and lower guide grooves formed in an inner side thereof, the guide rails extending in parallel having the respective inner sides thereof faced toward each other; a first group of guided pieces movably received in the upper guide groove of each guide rail; a second group of guided pieces movably received in the lower guide groove of each guide rail; a plurality of links each having one end pivotally connected to one guided piece of the first group and the other end pivotally connected to one guided piece of the second group, so that the guided pieces of the first and second groups and the links constitute a chain unit for each guide rail; a plurality of supporting rods each extending between one guided piece of the first group associated with one guide rail and another guided piece of the first group associated with the other guide rail; and a shading cloth having supported portions which are supported by the supporting rods respectively.

BRIEF DESCRIPTION OF THE DRAWINGS

Other objects and advantages of the present invention will become apparent from the following description when taken in conjunction with the accompanying drawings, in which:

FIG. 1 an illustration of a one-box motor vehicle to which a sunshade assembly of a first embodiment of the present invention is practically applied;

FIG. 2 is a perspective view of the sunshade assembly of the first embodiment, which is taken from the inside of the vehicle;

FIG. 8 is an illustration of a one-box motor vehicle to which a sunshade assembly of a second embodiment of the present invention is practically applied;

FIG. 9 is a perspective view of the sunshade assembly of the second, embodiment, which is taken from the inside of the vehicle;

FIG. 13 is an enlarged side view of a chain unit employed in the second embodiment, showing a condition wherein the chain unit assumes its fully extended condition;

FIG. 14 is a sectional view taken along the line XIV—XIV of FIG. 10A;

DETAILED DESCRIPTION OF THE INVENTION

Figure 3A:
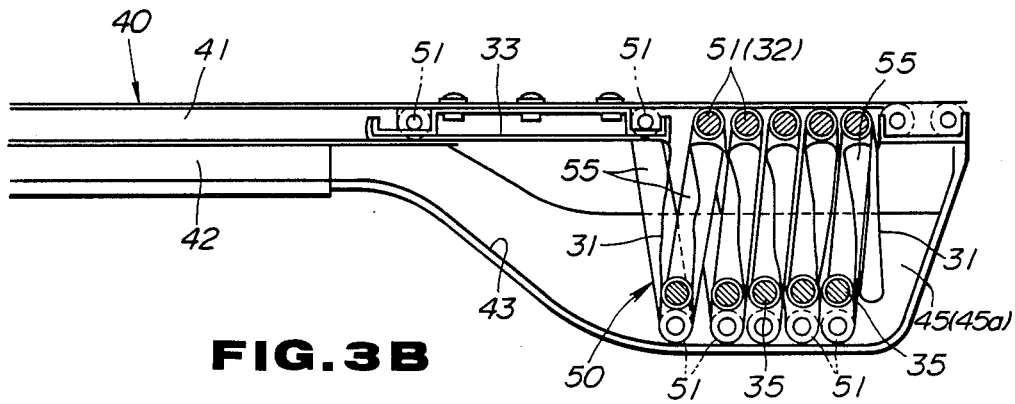
FIGS. 3A, 3B and 3C sectional views taken from the direction of the arrow "III" of FIG. 2, showing various conditions of the sunshade assembly respectively.

Referring to FIG. 1, there is shown a one-box motor vehicle 10 to which a sunshade assembly 30 of a first embodiment of the present invention is practically applied. As shown, the vehicle 10 is equipped with a sun roof construction 20 which is associated with a rectangular opening (or sun roof opening) 12 formed in a roof 11 of the vehicle 10. The sun roof construction 20 comprises a slide lid 21 of glass pane which is mounted beneath the roof 11 and slides forward and rearward to close and open the opening 12.

Referring to FIGS. 2 to 7, there is shown the sunshade assembly 30 of the first embodiment of the present invention, which is associated with the sun roof construction 20. The sunshade assembly 30 is arranged below the opening 12 in such a manner as to put therebetween the slide lid 21 in closed position.

As is best understood from FIG. 2, the sunshade assembly 30 comprises a foldable shading cloth 31 which, as will be described in detail hereinbelow, is expandable from its fully contracted position to its fully extended position to close the opening 12 of the roof 11. For achieving such expanding movement of the shading cloth 31, two parallel guide rails 40 and 40 are employed which are secured to side edges 13 and 13 (see FIG. 1) of the opening 12 to extend along the same respectively. Each guide rail 40 is constructed of aluminium and formed with upper and lower guide grooves 41 and 42 which extend in parallel. Upon assembly, the two guide rails 40 and 40 are arranged having the respective guide grooves 41 and 42 faced toward each other.

A plurality of guided pieces 51 are movably received in the upper and lower guide grooves 41 and 42 of each guide rail 40. The guided pieces 51 are constucted of a rigid plastic. As is seen from FIG. 4 or FIG. 5, each guided piece 51 comprises a shaft 52 and a roller 53 which is rotatably disposed about the shaft 52. During movement along the guide groove 41 or 42, the roller 53 runs on a truck defined by the groove.

For the purpose which will be described hereinafter, as is seen from FIG. 4, the shafts 52 of the guided pieces 51 associated with the upper guide groove 41 are each formed with a coaxial enlarged end portion 52a, and as is seen from FIG. 5, the shafts 52 of the guided pieces 51 associated with the lower guide groove 42 are each provided with an upwardly extending bracket 54 fixed thereto.

Figure 3B:
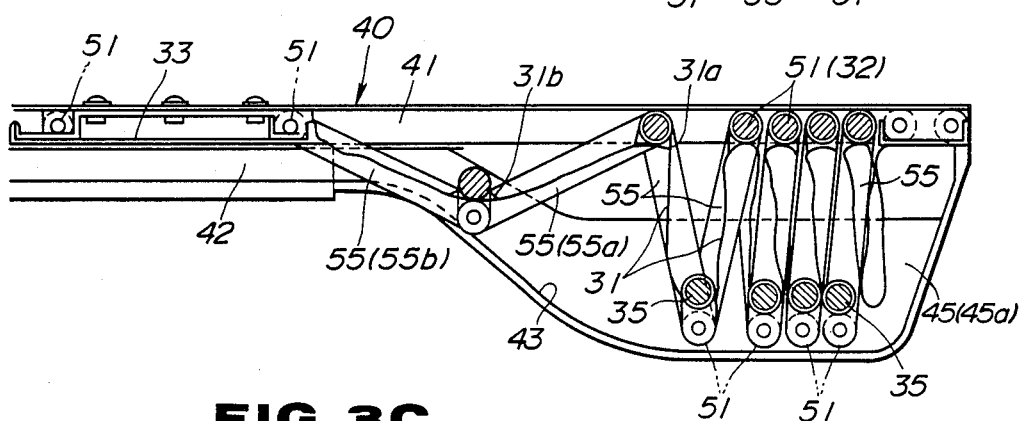
Figure 3C:
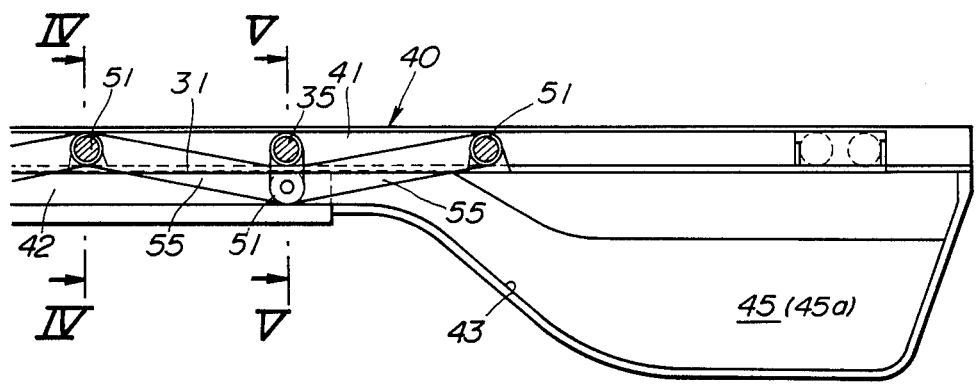

As is best seen from FIG. 3C, the guided pieces 51 are classified into first and second groups, the first group being associated with the upper guide groove 41, and the second group being associated with the lower guide groove 42.

The guided pieces 51 of the first (or second) group are connected to those of the second (or first) group through respective links 55 thereby to form a chain unit 50 for each guide rail 40. Thus, each guided piece 51 of one group is associated with two links 55 which extend from the guide pieces 51 of the other group. As is seen from FIG. 4, for achieving the connection between each guided piece 51 and each link 55, a pivotal connection is established between the link 55 and the associated shaft 52.

Figure 4:
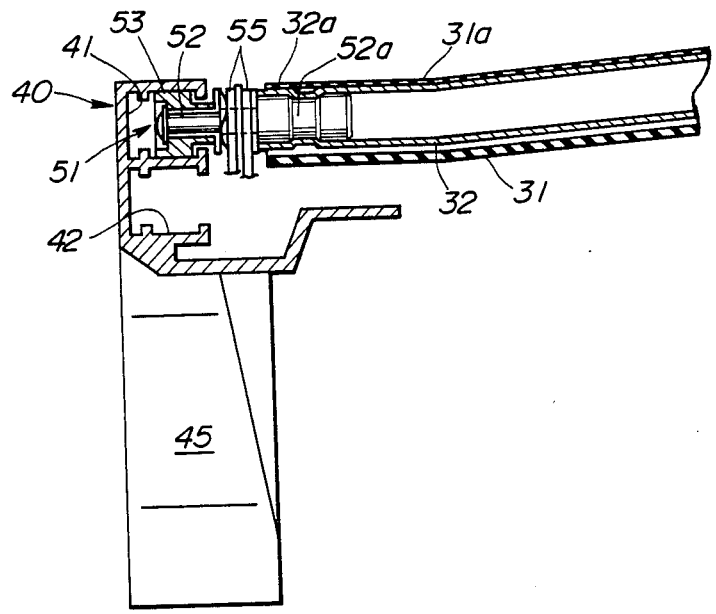
FIG. 4 is a sectional view taken along the line IV—IV of FIG. 3C.
Figure 5:
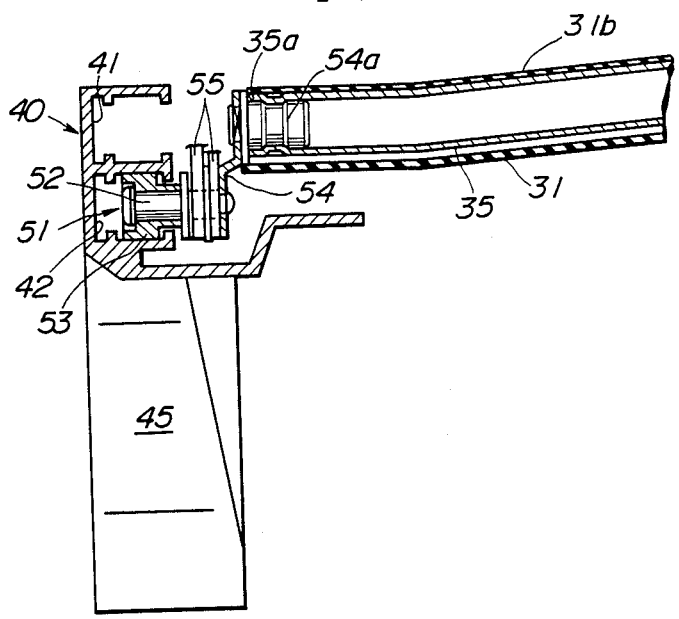
FIG. 5 is a sectional view taken along the line V—V of FIG. 3C.

As is understood from FIGS. 4 and 5, a plurality of supporting rods 32 and 35 extend between the two guide rails 40 and 40. These rods 32 and 35 are constructed of aluminium. As may be understood from FIG. 6, each of the supporting rods 32 and 35 is shaped like a bow. That is, upon assembly, these rods 32 and 35 are arranged having their protruded middle portions directed upward. The supporting rods 32 and 35 are classified into first and second groups, the first group 32 being associated with the guided pieces 51 of the first group, and the second group 35 being associated with the guided pieces 51 of the second group, as will be clarified from the following description.

That is, as is seen from FIG. 4, each supporting rod 32 of the first group has each end 32a tightly coupled with the enlarged end portion 52a of the shaft 52 of the guided piece 51 (first group) associated with the upper guide groove 41 of each guide rail 40. As is understood from FIGS. 3B and 4, the supporting rods 32 of the first group are passed through a first group of laterally extending sleeve portions 31a which are provided on the shading cloth 31 at equally spaced intervals.

As is well understood from FIGS. 2 and 3A, a leading plate 33 is connected to the front ends of the paired chain units 50 and 50. The leading plate 33 has at each side front and rear portions to which the shafts 52 of the guided pieces 51 are connected. The leading plate 33 has rear edge secured to front edge of the shading cloth 31. As is shown in FIG. 2, the leading plate 33 is provided at its middle portion with a knob 33a.

As is seen from FIG. 5, each supporting rod 35 of the second group has each end 35a tightly coupled with an enlarged shaft member 54a fixed to the bracket 54 of the guided piece 51 (second group) associated the lower guide groove 42 of each guide rail 40. As is seen from FIGS. 3B and 5, the supporting rods 35 of the second group are passed through a second group of laterally extending sleeve portions 31b which are provided on the shading clotch 31 at equally spaced intervals. The first group of sleeve portions 31a and the second group of sleeve portions 31b are arranged alternately on the shading cloth 31. The supporting rods 32 and 35 of the first and second groups thus support the shading cloth 31.

Figure 6:
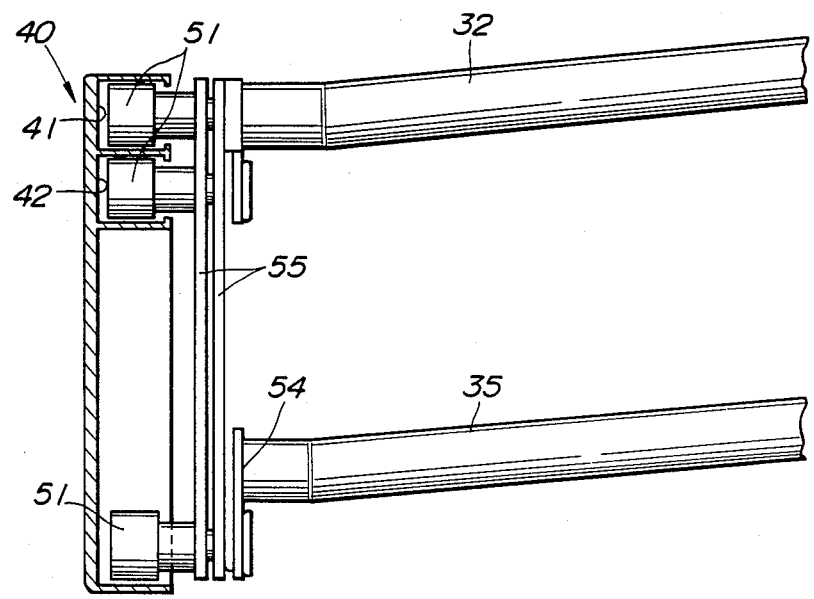
FIG. 6 is a sectional view taken along the line VI—VI of FIG. 2.
Figure 7:
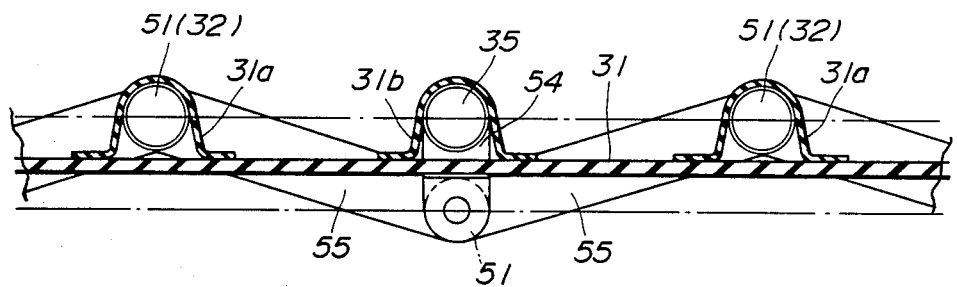
FIG. 7 is an enlarged side view of a chain unit employed in the first embodiment, showing a condition wherein the chain unit assumes its fully extended condition.

As is seen from FIGS. 3C and 6, the upper guide groove 41 of each guide rail 40 has the same size throughout the length thereof, while, the lower guide groove 42 of the same has an enlarged rear portion 45 which accommodates swingable movements of the guide pieces 51 of the second group. Designated by numeral 43 is a smoothly curved portion through which the major portion of the lower guide groove 42 and the enlarged rear portion 45 are connected.

The rearmost end of the shading cloth 31 is fixed to a cloth retainer (no numeral) which is connected to the rear ends of the guide rails 40 and 40 through a suitable biasing means (not shown). The retainer and the biasing means will be clarified in the part of an after-mentioned second embodiment. Although not shown in the drawings, a suitable cover plate extends laterally between the downwardly protruded edges of the enlarged rear portions 45 of the two guide rails 40 and 40 in order to define a container portion 45a (see FIG. 14) into which the supporting rods 32 and 35 are contained when fully folded.

In the following, operation of the sunshade assembly 30 of the first embodiment will be described.

For ease of description, the same will be commenced with respect to a full-open condition of the sunshade assembly 30, as shown in FIG. 3A. Under this condition, the chain units 50 and 50 are fully folded and held in the rear container portions 45 of the guide rails 40 and 40 and thus the shading cloth 31 is fully folded having the leading plate 33 placed behind the sun roof opening 12 of the vehicle 10.

When, for the purpose of closing the opening 12 with the shading cloth 31, the knob 33a of the leading plate 33 is pulled forward, the chain units 50 and 50 and the shading cloth 31 are gradually expanded in a manner as shown in FIGS. 3B and 3C. That is, during this expansion, the links 55 and 55 are expanded and then moved one after another toward the major portions of the guide grooves 41 and 42 feeding the first and second groups of guided pieces 51 and 51 into the upper and lower guide grooves 41 and 42 respectively. It is to be noted that during this, adjacent three guided pieces 51 left from the container portion 45 of each guide rail 40 are being moved shaping a triangular structure. That is, each chain unit 50 is gradually expanded making given triangular structures of the guided pieces 51 one after another. With this movement, the shading cloth 31 is gradually expanded one at a time by a degree corresponding to the area bounded by adjacent two supporting rods 32 and 35. That is, as is understood from FIG. 7, since each unit of the two adjacent supporting rods 32 and 35 is held by the fixed triangular structure defined by the guided pieces 51, each piece of the shading cloth 31 held by the two supporting rods 32 and 35 is moved forward while being expanded by the rods 32 and 35.

When the leading plate 33 comes to its foremost position, the same is hooked to a suitable catch member (not shown) which is provided beneath the vehicle roof 11 at a position in front of the opening 12. Under this condition, the chain units 50 and 50 and thus shading cloth 31 are fully expanded to fully close the sun roof opening 12 of the vehicle 10, as will be seen from FIGS. 1 and 3C.

When, for opening the sun roof opening 12, the knob 33a of the leading plate 33 is pulled rearward, the chain units 50 and 50 and the shading cloth 31 are gradually folded by taking steps which are reversed to the above-mentioned steps. That is, during rearward movement of the shading cloth 31, the extended condition of the same is kept unchanged. This is because the shape of each triangular structure of the guided pieces 51 is kept unchanged so long as the guided pieces 51 are placed in the major parallel portions of the guide grooves 41 and 42. When thus pushed rearward, the guided pieces 51 of the first group are straightly moved into the rear end portion of the upper guide groove 41 of each guide rail 40 and the guided pieces 51 of the second group are moved into the enlarged rear portion 45 of the lower guide groove 42 of each guide rail 40, causing the links 55 (viz., leading and trailing links 55a and 55b, as viewed in FIG. 3B) to turn about the guided pieces 51 of the second group counterclockwisely and clockwisely respectively, and at the same time, causing the leading and trailing links 55a and 55b to turn about the guided pieces 51 of the first group counterclockwisely and clockwisely respectively. With these movements, the shading cloth 31 is gradually folded into the rear container portion 45a one at a time by a degree corresponding to the area bounded by adjacent two supporting rods 32 and 35.

When the leading plate 33 comes to its rearmost position, the same is hooked to another catch member (not shown) which is provided beneath the vehicle roof 11 at a position behind the opening 12. Thus, the shading cloth 31 is fully folded in the rear container portion 45 as shown in FIG. 3A.

As is understood from the foregoing description, in accordance with the sunshade assembly 30 of the first embodiment, the shading cloth 31 can maintain an expanded condition even when the same assumes its half-closing (or half-opening) position.

Referring to FIG. 8, there is shown a one-box motor vehicle 10' to which a sunshade assembly 30' of a second embodiment of the present invention is practically applied. The vehicle 10' is equipped with a sun roof construction 20' which is associated with a rectangular opening 12 formed in a roof 11 of the vehicle 10'. Similar to the afore-mentioned one in the first embodiment, the sun roof construction 20' comprises a slide lid 21 of glass pane which is mounted beneath the roof 11 in a manner to slide forward and rearward to close and open the opening 12.

Referring to FIGS. 9 to 17, there is shown the sunshade assembly 30' of the second embodiment of the present invention, which is associated with the sun roof construction 20'.

Because the second embodiment 30' is similar in construction to the afore-mentioned first embodiment 30, detailed explanation will be directed to only the parts or portions which are different from those of the first embodiment 30 and the parts and portions substantially the same as those of the first embodiment 30 are denoted by the same numerals.

Two parallel guide rails 40 and 40 are secured to the roof 11, each having upper and lower guide grooves 41 and 42. Each guide groove 41 or 42 receives therein first and second groups of guided pieces 51 and 51 which are connected to one another through links 55 and 55. Each guided piece 51 of the first group (viz., the guided piece associated with the upper guide groove 41 of the guide rail 40) comprises a shaft 52 and a roller 53 rotatably disposed on the shaft 52, and an coaxial enlarged end portion 52a. Between paired guided pieces 51 and 51 in the respective guide rails 40 and 40, there are arranged a plurality of bow-shaped supporting rods 32 for supporting the shading cloth 31. For this supporting, the shading cloth 31 is formed with laterally extending sleeve portions 31a through which the supporting rods 32 are passed. These arrangements are similar to those of the first embodiment 30.

However, in the second embodiment 30', the guided pieces 51 of the second group (viz., the guided pieces associated with the lower guide groove 42) have no means for supporting the shading cloth 31, unlike the case of the first embodiment 30. This will be well understood from FIGS. 10A and 10B wherein the shading cloth is folded and held in the rear container portion 45a. As is seen from FIG. 12, each guided piece 51 of the second group comprises the shaft 52, a roller 53 rotatably disposed on the shaft 52. Two links 55 and 55 extending from the guided pieces 51 of the first group are pivotally connected to the shaft 52.

Figure 11:
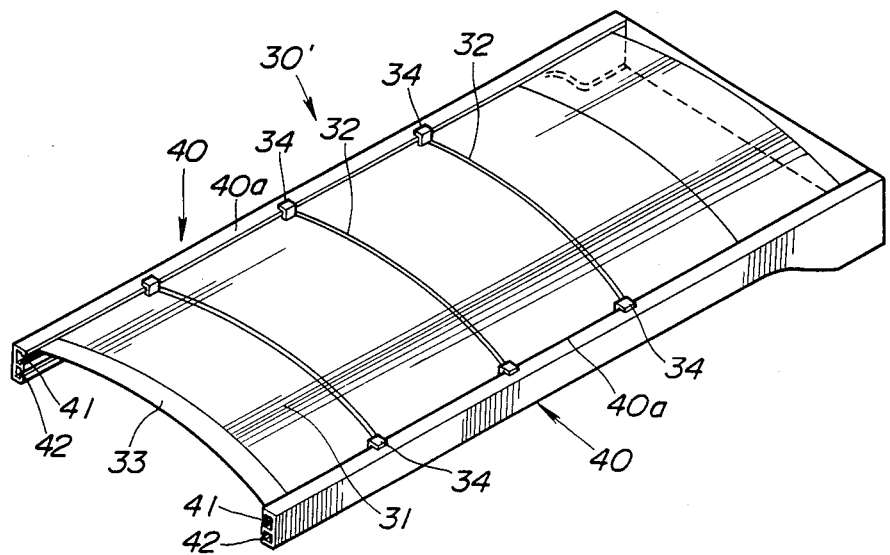
FIG. 11 is a perspective view of the sunshade assembly of the second embodiment, showing a condition wherein a shading cloth is fully extended.
Figure 12:
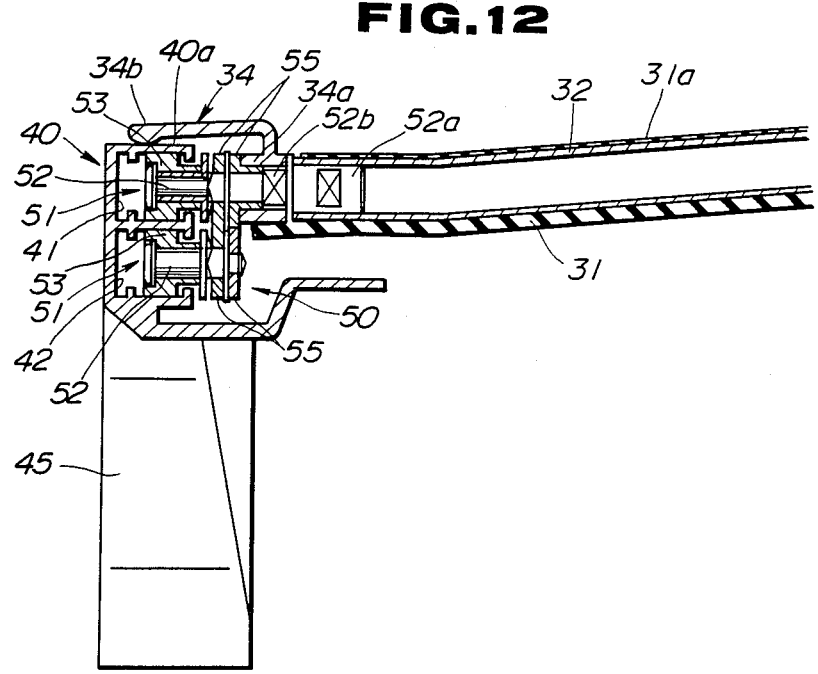
FIG. 12 is a sectional view taken along the line XII—XII of FIG. 9.

As is seen from FIGS. 11 and 12, each guided piece 51 of the first group is provided with a holder 34 for suppressing a pivotal movement of the associated supporting rod 32 during the movement of the shading cloth 31 along the guide rails 40 and 40. That is, the holder 34 comprises a base portion 34a fixed to the shank portion 52b of the shaft 52 of the guided piece 51, and a tongue portion 34b extending from the base portion 34a and pressed at its leading end upon an upper surface 40a of the rail 40.

In the second embodiment 30', a tensioning mechanism 60 is further provided for each guide rail 40 for assuring the expansion of the shading cloth 31.

Figure 10A:
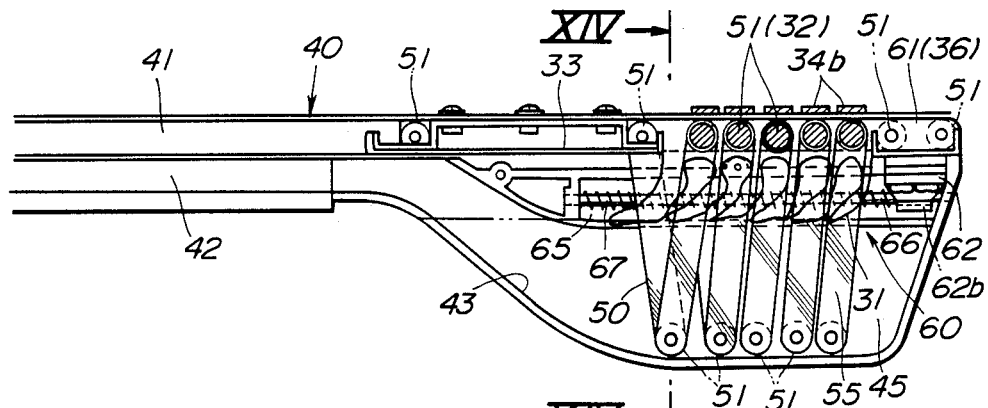
FIGS. 10A, 10B and 10C are sectional views taken from the direction of the arrow "X" of FIG. 9, showing various conditions of the sunshade assembly respectively.
Figure 10B:
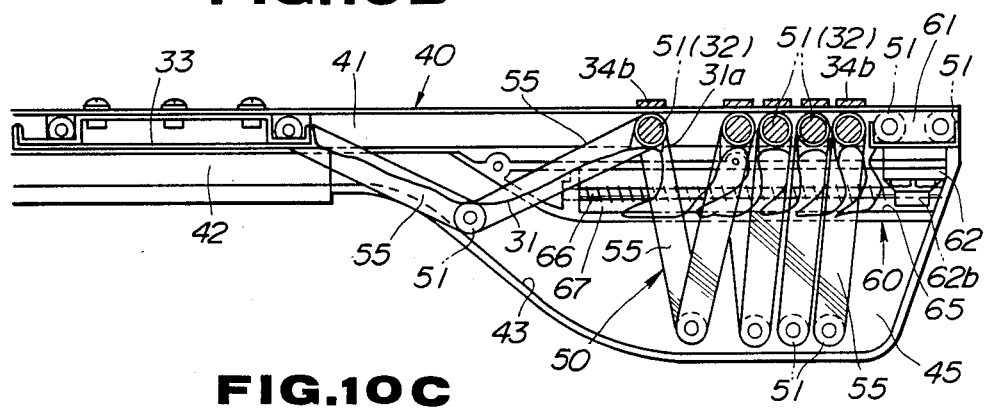
Figure 10C:
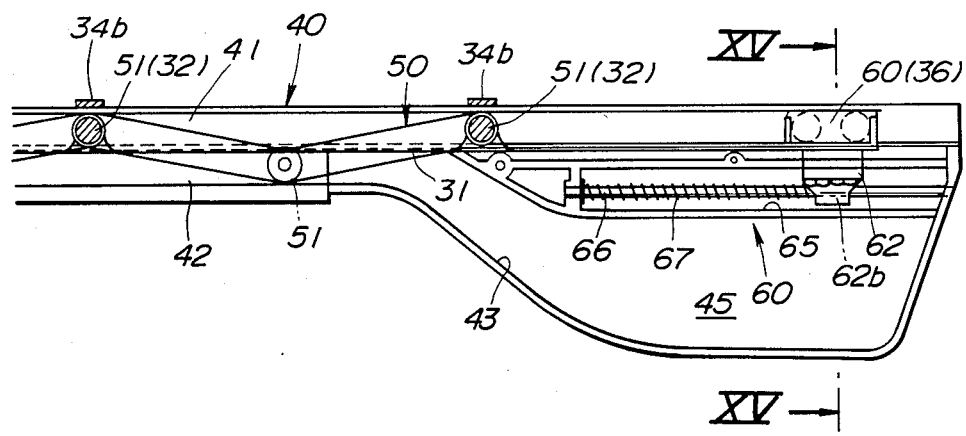
Figure 15:
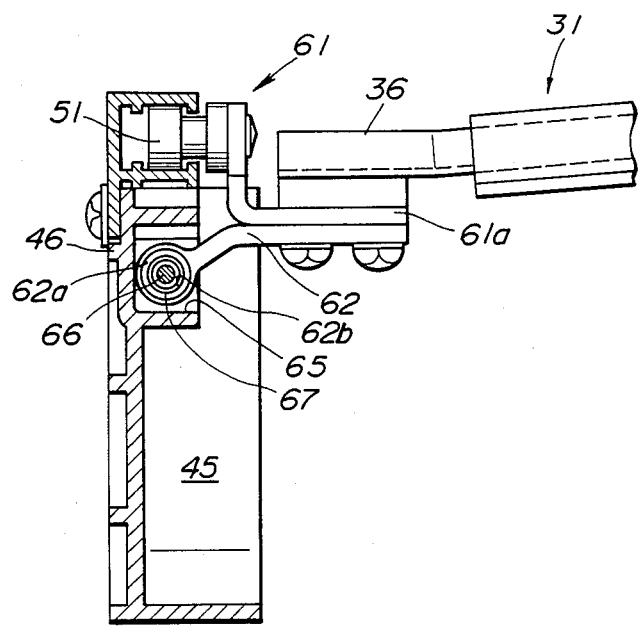
FIG. 15 a sectional view taken along the line XV—XV of FIG. 10C.

As will be understood from FIGS. 10A and 15, a rear plate 36 is connected to the rear end of the shading cloth 31. As is seen from FIG. 15, the rear plate 36 has each side secured to an arm portion 61a of a bracket 61. Each bracket 61 carries thereon two guided pieces 51 and 51 which are associated with the upper guide groove 41 of the guide rail 40. Thus, it will be appreciated that the rear plate 36 is moved along the upper guide grooves 41 and 41 of the guide rails 40 and 40 in response to the movement of the shading cloth 31. As is seen from FIGS. 10C and 15, an arm member 62 extends from each bracket 61, which has an apertured head portion 62a spacedly received in an elongate groove 65 which is formed in the inboard side of the each guide rail 40 and extends along the upper guide groove 41. A guide rod 66 passes through an opening 62b of the head portion 62a of the arm member 62. The rod 66 extends in and along the elongate groove 65 and has both ends secured to front and rear walls (no numerals) of the groove 65. Thus, the forward and rearward movement of the rear plate 36 along the upper guide groove 41 of each guide rail 40 induces a guided movement of each arm member 62 along the corresponding guide rod 66. As is best seen in FIG. 10C, a compression spring 67 is disposed about the guide rod 66 between the front wall of the groove 65 and the head portion 62a of the arm member 62, so that the rear plate 36 is biased rearward.

In the second embodiment 30', a check mechanism 70 is further employed for each guide rail 40 for catching the leading plate 33 of the shading cloth 31 in a snap action manner when the same comes to its foremost position.

Figure 16:
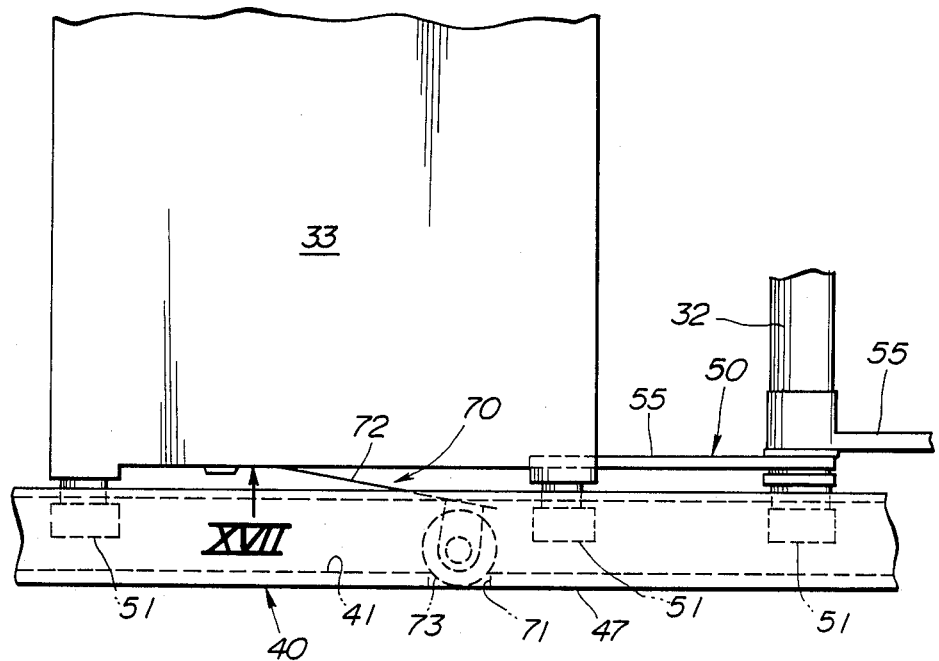
FIG. 16 is a plan view of a front part of the sunshade assembly of the second embodiment, showing a check mechanism employed in the sunshade assembly.
Figure 17:
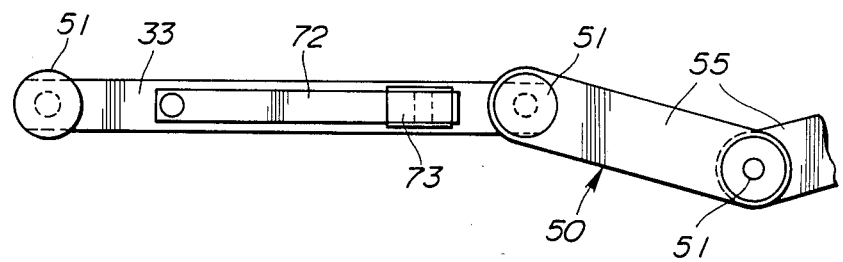
FIG. 17 is a side view taken from the direction of the arrow "XVII" of FIG. 16.

As is seen from FIGS. 16 and 17, the check mechanism 70 comprises an arm member 72 of resilient material extending from each side of the leading plate 33, a roller 73 rotatably connected to the leading end of the arm member 72, and a cut 71 formed in the bottom wall 47 of the upper guide groove 41 of each guide rail 40. Upon assembly, the roller 73 is received in the upper guide groove 41 while being pressed upon the bottom wall 47 of the same.

In the following, operation of the sunshade assembly 30' will be described.

For ease of description, the same will be commenced with respect to the a full-open condition of the sunshade assembly 30' as shown in FIG. 10A. Under this condition, the chain units 50 and 50 and the shading cloth 31 are fully folded and held in the container portion 45 defined by the rear cover plate (not shown) having the leading plate 33 placed behind the sun roof opening 12 of the vehicle 10'.

When, for the purpose of closing the opening 12 with the shading cloth 31, the knob 33a of the leading plate 33 is pulled forward, the chain units 50 and 50 and the shading cloth 31 are gradually expanded in a manner as has been described in the part of the first embodiment 30. That is, during this movement, each chain unit 50 is gradually expanded making given triangular structures by the guided pieces 51 one after another. Thus, as is seen from FIG. 13, the shading cloth 31 is gradually moved forward while being expanded by the supporting rods 32. During this movement, the holders 34 slide on the upper surfaces 40a of the guide rails 40 and 40 thereby to keep each supporting rod 32 in proper posture.

When the leading plate 33 comes near to its foremost position, the chain units 50 and 50 are almost drawn from the container portion 45 thereby pulling the rear plate 36 of the shading cloth 31 forward against the biasing force of the compression spring 67 of each tensioning mechanism 60. Thus, under this condition, the shading cloth 31 is expanded adequately.

When the leading plate 33 comes to the foremost position, the roller 73 of each check mechanism 70 falls into the cut 71 of the upper guide groove 41 (see FIG. 16) thereby placing, with a certain holding force, the leading plate 33 at the foremost position Under this condition, the opening 12 of the vehicle roof 11 is fully covered with the shading cloth 31. Because, under this condition, the shading cloth 31 is entirely extended by the tensioning mechanism 60, undesired creases or wrinkles do not appear on the shading cloth 31.

When, for opening the sun roof opening 12, the knob 33a of the leading plate 33 is pulled rearward with a certain force, the roller 73 of each check mechanism 70 gets out the cut 71 against the biasing force of the resilient arm member 72. Once the roller 73 gets out the cut 71, the entire of the chain units 50 and 50 and that of the shading cloth 31 are moved backward instantly but slightly due to the biasing force produced by the tensioning mechanisms 60. Thereafter, in response to the rearward movement of the leading plate 33, the chain units 50 and 50 and the shading cloth 31 are gradually folded into the container portion 45 by taking steps which are reversed to the above-mentioned steps. Because of the same reason as has been mentioned in the first embodiment 30, the extended condition of the shading cloth 31 is kept unchanged so long as the guided pieces 51 are placed in the major portions of the upper and lower guide grooves 41 and 42. When the leading plate 33 comes to its rearmost position, the same is hooked to the guide rails 40 by means of another check mechanism (not shown) which has substantially the same construction as the above-mentioned check mechanism 70. With this step, the chain units 50, the supporting rods 32 and the shading cloth 31 are fully folded in the rear container portion 45a as shown in FIG. 10A. Due to provision of the rear cover plate (not shown) extending between the downwardly protruded edges of the enlarged rear portions 45 of the two guide rails 40 and 40, the folded parts 50, 32 and 31 are concealed from the inside of the vehicle 10'.

Figure 18:
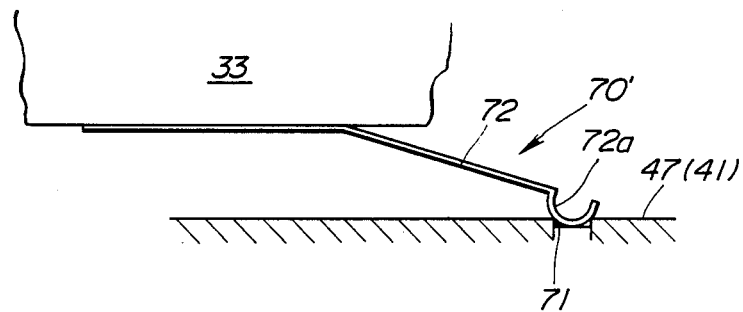
FIG. 18 is a plan view of a modification of the check mechanism.

Referring to FIG. 18, there is shown a modification 70' of the above-mentioned check mechanism 70. As shown, the modification 70' comprises a resilient arm member 72 extending from each side of the leading plate 33, and a cut 71 formed in the bottom wall 47 of the upper guide groove 41 of each guide rail 40. The arm member 72 is formed with a curled head 72a which slides on the bottom wall 47 of the upper guide groove 41 and falls into the cut 71.

Figure 19:
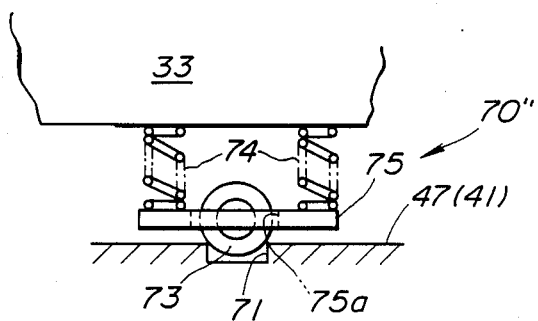
FIG. 19 is a plan view of another modification of the check mechanism.

Referring to FIG. 19, there is shown another modification 70'' of the check mechanism 70. The modification 70'' comprises a base plate 75 which has a slit 75a formed therethrough, a roller 73 rotatably held in the slit 75a of the base plate 75, two compression springs 74 and 74 compressed between each side of the leading plate 33, and a cut 71 formed in the bottom wall 47 of the upper guide groove 41 of each guide rail 40. Upon assembly, the roller 73 is received in the upper guide groove 41 to run on the bottom wall 47. Due to the work of the springs 74, the roller 73 is pressed on the bottom wall 47 and forced to fall into the cut 71 when the leading plate 33 comes to the foremost position.

As is described hereinabove, in the sunshade assembly according to the present invention, the undesired creases and wrinkles do not appear on the shading cloth even when the shading cloth assumes its half-closing (or half-opening) position relative to the sun roof opening of the vehicle. Furthermore, in the second embodiment 30' of the invention, the provision of the tensioning mechanism induces an adequate expansion of the shading cloth in the full-closing position thereby completely suppressing formation of the creases and wrinkles on the shading cloth.

Although the above-description is directed to the examples wherein only one shading cloth is used, the present invention is applicable to an example wherein two, viz., front and rear shading clothes are used for closing and opening the sun roof opening.

What is claimed is:

1. A sunshade assembly comprising a shading cloth and means for preventing creasing and wrinkling of said shading cloth, said means for preventing creasing and wrinkling of said shading cloth comprising:
   a pair of guide rails, each having longitudinally extending upper and lower guide grooves formed in an inner side thereof, said guide rails extending in parallel having the respective inner sides thereof faced toward each other;
   a first group of guided pieces movably received in said upper guide groove of each guide rail;
   a second group of guided pieces movably received in said lower guide groove of each guide rail;
   a plurality of links each having one end pivotally connected to one guided piece of the first group and the other end pivotally connected to one guided piece of the second group, so that said guided pieces of the first and second groups and said links constitute a chain unit for each guide rail;
   a first group of supporting rods each extending between one guided piece of the first group associated with one guide rail and another guided piece of the first group associated with the other guide rail; and
   said shading cloth having first supported portions which are supported by said supporting rods respectively.

2. A sunshade assembly as claimed in claim 1, in which said upper guide groove has the same size throughout the length thereof, and in which said lower guide groove has an enlarged end portion in order to permit swingable movements of the second group of guided pieces therein.

3. A sunshade assembly as claimed in claim 2, in which each of said first group of guided pieces comprises a shaft which is fixed to one end of said supporting rod and a roller which is rotatably disposed on said shaft and put in said upper guide groove to run along the same.

4. A sunshade assembly as claimed in claim 3, in which said shaft of the guided piece is formed with a coaxial enlarged end portion which is tightly received in a bore formed in said supporting rod.

5. A sunshade assembly as claimed in claim 4, in which said shaft of the guided piece has a portion to which two links extending from adjacent guided pieces of the second group are pivotally connected.

6. A sunshade assembly as claimed in claim 5, in which each of the second group of guided pieces comprises a shaft and a roller which is rotatably disposed on said shaft and put in the lower guide groove to run along the same.

7. A sunshade assembly as claimed in claim 6, in which adjacent three guided pieces of the first and second groups, which are connected to one another through the corresponding two links, constitute apexes of a triangular structure.

8. A sunshade assembly as claimed in claim 6, in which each of supporting rods is shaped like a bow and so arranged that the protruded middle portion is directed upward.

9. A sunshade assembly as claimed in claim 8, in which said supported portions of said shading cloth comprise laterally extending sleeve portions which are formed on an upper surface of said shading cloth to pass therethrough the supporting rods.

10. A sunshade assembly as claimed in claim 9, further comprising a leading plate which has at each side first and second portions to which two guided pieces of the first group are operatively connected, said leading plate having a rear edge secured to a front edge of said shading cloth.

11. A sunshade assembly as claimed in claim 10, further comprising a second group of supporting rods each extending between one guided piece of the second group associated with one guide rail and another guided piece of the second group associated with the other guide rail, said second group of supporting rods supporting second supported portions formed on said shading cloth.

12. A sunshade assembly as claimed in claim 11, in which said second supported portions of the shading cloth comprise sleeve portions which are formed on the upper surface of said shading cloth to pass the second group of supporting rods therethrough.

13. A sunshade assembly as claimed in claim 12, in which each of the second group of guided pieces further comprises a bracket which has one end fixed to the shaft of the guided piece and the other end fixed to one of the second group of supporting rods.

14. A sunshade assembly as claimed in claim 10, further comprising a tensioning mechanism which is associated with a rear part of said shading cloth in order to apply a tensioning force to the shading cloth when the latter assumes its fully extended position.

15. A sunshade assembly as claimed in claim 14, in which said tensioning mechanism comprises:
   a rear plate connected to the rear end of said shading cloth to move therewith, and
   a spring for biasing said rear plate in one direction when said rear plate is moved in the other direction in response to the expanding movement of said shading cloth.

16. A sunshade assembly as claimed in claim 15, in which said tensioning mechanism further comprises:
   a bracket having one end connected to one end of said rear plate and the other end connected to two of the first group of guided pieces;
   an arm member connected to said bracket and having an apertured head portion; and
   a guide rod fixed to one of the guide rails and passing through the aperture of said apertured head portion of the arm member,
   wherein said spring is disposed about said guide rod and compressed between said apertured head portion and a wall portion formed on said guide rail.

17. A sunshade assembly as claimed in claim 16, in which said guide rod extends in and along a groove which is formed in the inboard side of the guide rail.

18. A sunshade assembly as claimed in claim 17, further comprising a check mechanism for locking said leading plate at a given position in a snap action manner when the plate comes to said given position.

19. A sunshade assembly as claimed in claim 18, in which said check mechanism comprises:
   a resilient arm member extending from one side of said leading plate;
   a roller rotatably connected to a leading end of said resilient arm member; and a cut formed in a bottom wall of the upper guide groove of each guide rail, wherein said roller is received in said upper guide groove and pressed against said bottom wall.

20. A sunshade assembly as claimed in claim 18, in which said check mechanism comprises:

a resilient arm member extending from one side of said leading plate, said resilient arm member having a leading end which is curled to form a head portion; and a cut formed in a bottom wall of the upper guide groove of each guide rail, wherein said head portion of the resilient arm member is received in said upper guide groove and pressed against the bottom wall.

21. A sunshade assembly as claimed in claim 18, in which said check mechanism comprises:

a base plate having a slit formed therethrough;

a roller spacedly put in said slit and rotatably held by said base plate;

springs compressed between said base plate and one side of said leading plate; and a cut formed in a bottom wall of the upper guide groove of each guide rail, wherein said roller is received in said upper guide groove and pressed against said bottom wall.

* * * * *